(12) United States Patent
Stafford

(10) Patent No.: US 9,998,025 B1
(45) Date of Patent: Jun. 12, 2018

(54) NUCLEAR INSTRUMENTATION SYSTEM HIGH VOLTAGE POWER SUPPLY

(71) Applicant: Westinghouse Electric Company LLC, Cranberry Township, PA (US)

(72) Inventor: Shawn C. Stafford, Scottdale, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days. days.

(21) Appl. No.: 15/341,518

(22) Filed: Nov. 2, 2016

(51) Int. Cl.
| | |
|---|---|
| *H02M 7/04* | (2006.01) |
| *H02M 1/32* | (2007.01) |
| *H02M 1/44* | (2007.01) |
| *G21D 1/02* | (2006.01) |
| *G21C 17/06* | (2006.01) |

(52) U.S. Cl.
CPC .............. *H02M 7/04* (2013.01); *G21C 17/06* (2013.01); *G21D 1/02* (2013.01); *H02M 1/32* (2013.01); *H02M 1/44* (2013.01); *G21Y 2002/40* (2013.01)

(58) Field of Classification Search
CPC ..... H02M 2001/006; H02M 2001/007; H02M 3/28; H02M 5/44; H02M 7/12; H02M 2001/0067
USPC ............................ 363/15, 16, 34, 37, 39, 65
See application file for complete search history.

(56) References Cited

U.S. PATENT DOCUMENTS

| | | | | |
|---|---|---|---|---|
| 4,860,185 | A * | 8/1989 | Brewer | ...................... G06F 1/28 307/66 |
| 5,534,768 | A * | 7/1996 | Chavannes | ............. G05F 1/577 307/75 |
| 6,198,642 | B1 * | 3/2001 | Kociecki | ............. H02M 1/4225 307/150 |
| 2014/0254217 | A1 * | 9/2014 | Li | .......................... G01R 21/06 363/37 |

* cited by examiner

*Primary Examiner* — Jeffrey Sterrett
(74) *Attorney, Agent, or Firm* — Joseph C. Spadacene; Westinghouse Electric Company LLC

(57) ABSTRACT

A high voltage power supply comprising a Line Powered Switcher module for converting a mains powered alternating current input to a direct current output and a High Voltage Switcher module for raising the voltage level of the direct current output. Both modules are independent switched mode power supplies and the high voltage power supply includes ripple, overcurrent and overvoltage protection as well as protection against electromagnetic interference.

8 Claims, 7 Drawing Sheets

NUCLEAR INSTRUMENTATION SYSTEM HIGH VOLTAGE POWER SUPPLY

BACKGROUND

1. Field

This invention pertains generally to direct current power supplies and more particularly to such power supplies that power the ex-core neutron detectors of a nuclear power plant.

2. Related Art

In a pressurized water reactor power generating system, heat is generated within the core of a pressure vessel by a fission chain reaction occurring in a plurality of fuel rods supported within the core. The fuel rods are maintained in a spaced relationship within fuel assemblies with the space between fuel rods forming coolant channels through which borated water flows. Hydrogen within the coolant water moderates the neutrons emitted from enriched uranium within the fuel to increase the number of nuclear reactions and thus increase the efficiency of the process. Control rod guide thimbles are interspersed within the fuel assemblies in place of fuel rod locations and serve to guide control rods which are operable to be inserted or withdrawn from the core. When inserted, the control rods absorb neutrons and thus reduce the number of nuclear reactions and the amount of heat generated within the core. Coolant flows through the assemblies out of the reactor to the tube side of steam generators where heat is transferred to water in the shell side of the steam generators at a lower pressure, which results in the generation of steam used to drive a turbine. The coolant exiting the tube side of the steam generator is driven by a main coolant pump back to the reactor in a closed loop cycle to renew the process.

The power level of a nuclear reactor is generally divided into three ranges: the Source or Startup Range, the Intermediate Range, and the Power Range. The power level of the reactor is continuously monitored to assure safe operation. Such monitoring is typically conducted by means of neutron detectors placed outside and inside the reactor core for measuring the neutron flux of the reactor. Since the neutron flux in the reactor at any point is proportional to the fission rate, the neutron flux is also proportional to the power level.

Fission and ionization chambers have been used to measure flux in the Source, Intermediate and Power Range of a reactor. Typical fission and ionization chambers are capable of operating at all normal power levels, however, they are generally not sensitive enough to accurately detect low level neutron flux emitted in the Source Range. Thus, separate low level Source Range detectors are typically used to monitor neutron flux when the power level of the reactor is in the Source Range. The high voltage supply is a component within the Nuclear Instrumentation System (NIS) which delivers bias voltages to the ex-core neutron detectors which convert the high voltage to charge pulses or current at rates or magnitudes dependent on the neutron flux. The pulse rates and currents are processed by the NIS for information on plant power and to provide signals for subsequent safety systems. There are two versions of the power supply whose output voltage range differs: One version covers 0 to 1500 VDC and the other covers 0 to 2500 volts of direct current (VDC). In each NIS there are typically three different types of detectors which require the high voltage bias for operation, two of which require up to 1500 VDC while a third requires up to 2500 VDC.

A new high voltage power supply design is needed as a replacement for an existing design which was installed during the construction of the nuclear plant. The existing unit contains proprietary and outdated technology which is becoming difficult to repair and/or replace. Extended vendor lead times and reliability issues are becoming more common.

Various aspects of the high voltage required for the detectors and the NIS overall dictate particular functional requirements of the high voltage supply. For instance, the system requires a high voltage that is very low in alternating current (AC) components (ripple) or impulsive noise, which could be translated by the detector into pulses that combine with the desired neutron generated pulses and interfere with the processed information or trip signals. Faults in the NIS cabling can lead to short circuits on the output of the supply or other degraded load conditions. The high voltage power supply must address these conditions while remaining intact once the faults are addressed.

SUMMARY

This invention provides a power supply including an alternating current input and a direct current output that is configured to be adjustable between substantially 0 and 2,500 VDC. A test point on the power supply is configured to provide an operator with information about any voltage ripple superimposed on the direct current output.

In one embodiment, the power supply comprises two separate circuit modules, a first module of the two separate circuit modules comprises a line powered switcher for converting the alternating current input into a steady state direct current at the direct current output and a second module of the two separate circuit modules comprises a high voltage switcher constructed to raise the voltage level provided by the first module to a desired adjustable output voltage. In the foregoing embodiment the first module and the second module are respectively independent switched mode power supplies.

Preferably, the first module includes a series arrangement of, an input current limiter, a first surge protector, an inrush limiter, a line filter, an EMI filter, a second surge protector, an input rectifier/filter, a transformer, an output rectifier and an output filter. One of the first surge protector and the second surge protector is preferably a Metal Oxide Varistor and another of the first surge protector and the second surge protector is a transient voltage suppressor. The foregoing embodiment further includes a feedback controller/switch optically coupled in series with a reference generator in parallel with series arrangement of the transformer, output rectifier and output filter.

In another embodiment, the second module comprises a wire-wound potentiometer connected between a reference voltage and ground with the wiper configured to move along and in electrical contact with the resistive wire within the potentiometer, the wiper being connected in a series arrangement including a buffer amplifier, a controller, a driver/switches, a high voltage transformer, an output rectifier doubler and an output filter. Preferably, a feedback loop extends between an output of the output filter and an input to the controller. This embodiment, desirably, also includes an overvoltage sensing circuit connected between an output of the output filter and the controller in parallel with the series arrangement, the overvoltage sensing circuit being configured to identify an overvoltage condition and signal the controller when an overvoltage condition is detected to shut down the high voltage portion of the power supply. This embodiment also may include an overcurrent sensing circuit connected between the controller and the driver/switches, in parallel with the series arrangement, the overcurrent sensing circuit being configured to identify an overcurrent condition and signal the controller when an overcurrent condition is detected to shut down the power supply.

Preferably, the power supply is at least partially enclosed within a housing including a plurality of lights visible from the housing which, when lit, respectively identify an overcurrent, overvoltage and ripple condition in the direct current output.

BRIEF DESCRIPTION OF THE DRAWINGS

A further understanding of the invention can be gained from the following description of the preferred embodiments when read in conjunction with the accompanying drawings in which.

This invention provides a replacement for currently in use ex-core nuclear detector power supplies that were originally available in two versions intended to be used in different NIS ranges. Specifically, the Source Range application requires a higher bias voltage and its supply generates up to 2500 VDC to the BF3 neutron detectors used in that range. The other version generates up to 1500 V and is used in the Power and Intermediate Range applications.

Each version of the units of this invention is configured to provide the detector bias from an applicable drawer, with the unit mounted in the drawer bracket and connected to the detector with a dedicated triaxial cable. A terminal block connector on the unit provides connections to the drawer to interface to test points or a meter (depending on the version), the high voltage adjustment potentiometer, and AC power inputs. The unit is configurable using two jumpers located on the printed circuit board. Depending on the range selection jumper location the unit will either be the 1500 V version or the 2500 V version. A second jumper selects whether the unit metering circuit interfaces to a test point (1500V version) or a meter (2500 V version). The jumpers are for use during manufacture of the units and not for customer configuration.

Figure 1:
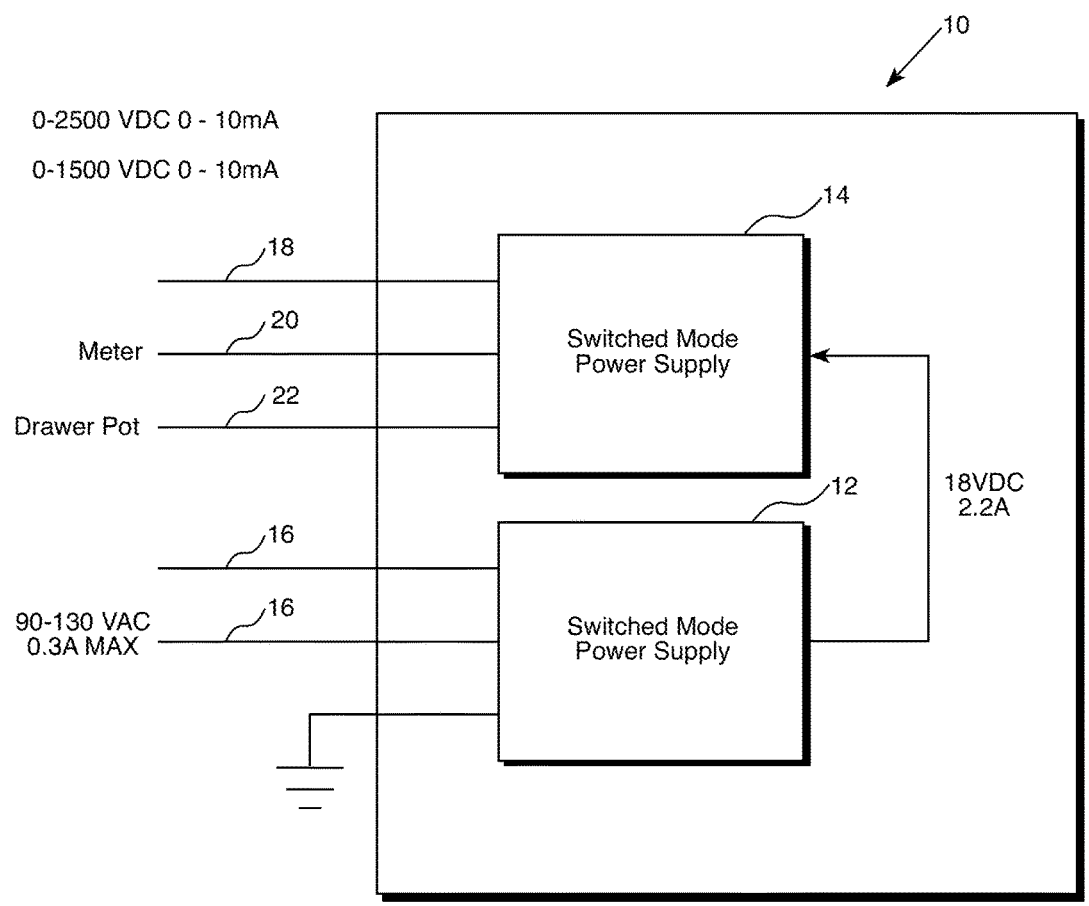
FIG. 1 is a high level block representation of the High Voltage Power Supply of this invention.

In general, the design structure of the replacement power supply (10) of this invention is shown in FIG. 1 and is comprised of two independent switched mode power supplies (SMPS) (12), (14); where one supply (12) creates the unit's internal power from the external AC source (16) and another supply (14) creates the high voltage, which is distributed at the output (18).

Figure 2:
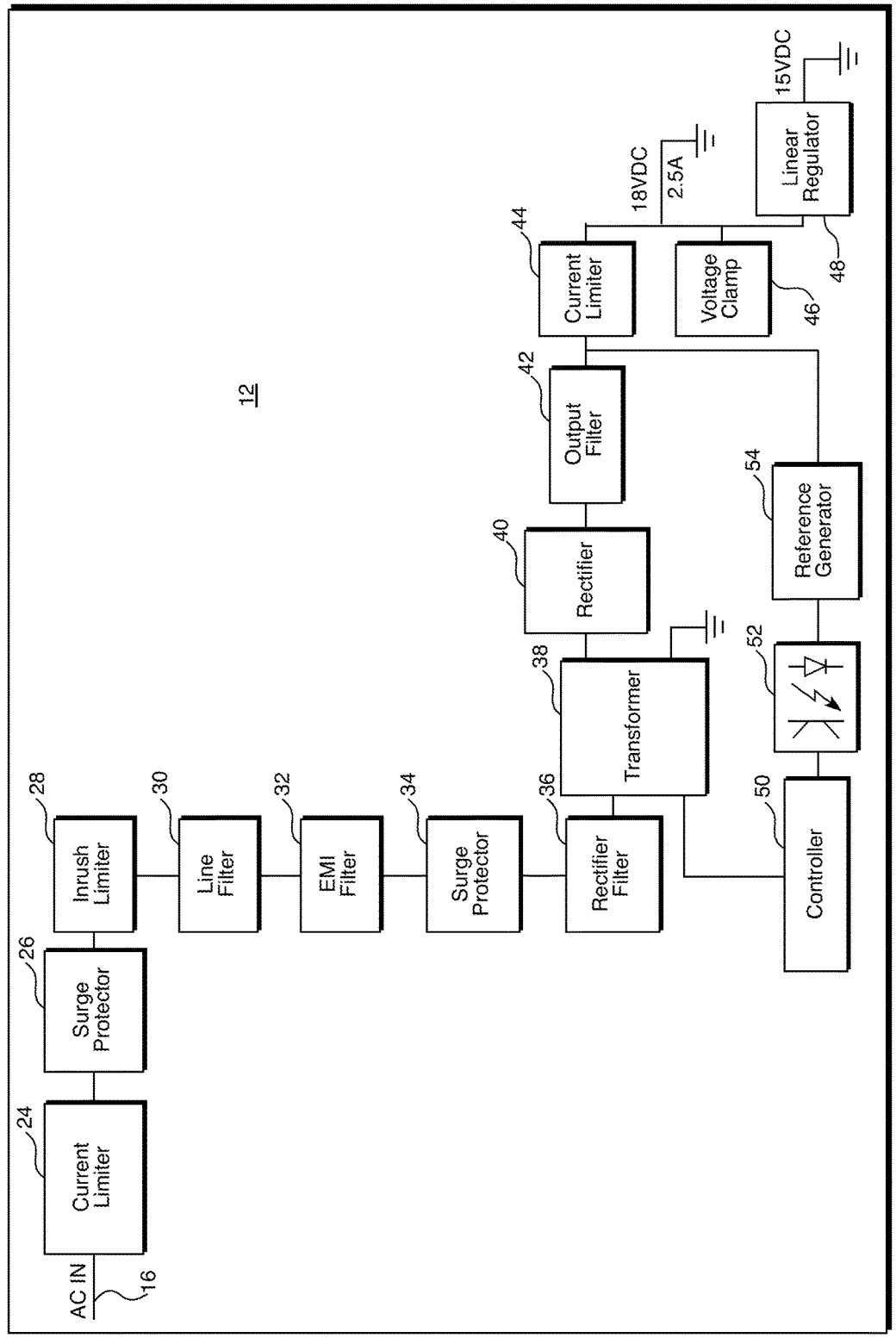
FIG. 2 is a component block diagram of the line powered portion of the High Voltage Power Supply of one embodiment of this invention.
Figure 8:
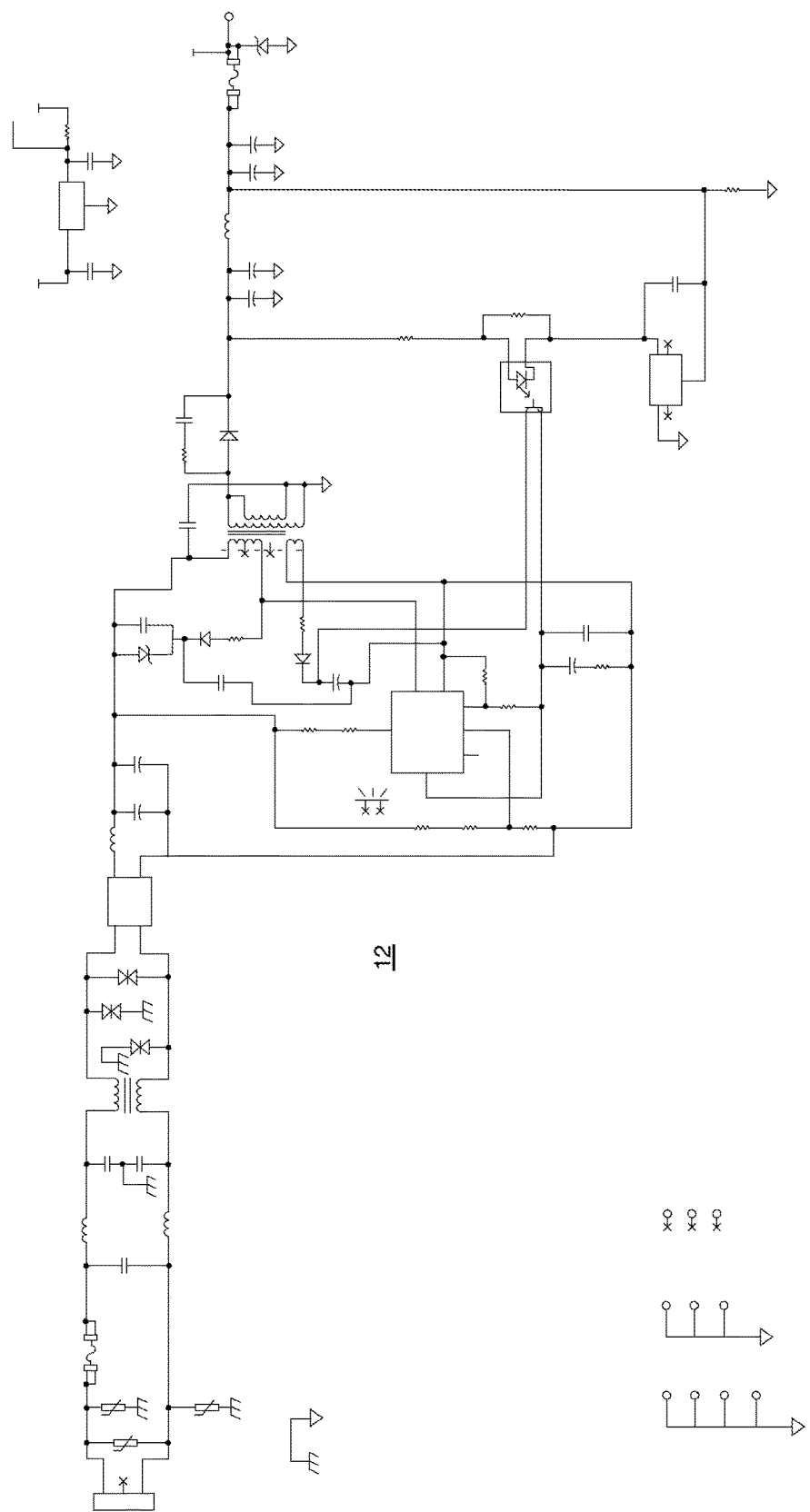
FIG. 8 is a schematic circuitry diagram of the line powered portion of the High Voltage Power Supply shown in FIG. 2.

The line powered switcher (12) provides the power for the entire unit when AC power is applied; it will also provide the required peak power for all output conditions of the high voltage power unit (10) with as much efficiency as reasonably possible to reduce overall power dissipation in the drawers and, therefore, the entire NIS. The line powered switcher (12) also provides abundant levels of input surge protection and electro-magnetic interference (EMI) filtering for greater reliability and low risk of signal emissions. A block diagram of the line powered switcher (12) is shown in FIG. 2. The AC input is fed through a current limiter (24), such as a fuse, to a surge protection device (26), such as a Metal Oxide Varistor. The output of the Varistor is inputted to an inrush limiter (28), which outputs through a line filter (30) to an electro-magnetic interference filter (32). The output of the electro-magnetic interference filter is conveyed through another surge protector (34), such as a transient voltage suppressor, to an input rectifier/filter (36), whose output is connected to the input of transformer (38). The output of the transformer (38) is conveyed through the output rectifier (40) and the output filter (42) to the input of the current limiter (44). A controller/switch (50) is serially connected though optical isolation (52) to a reference generator (54) with the series connection extending between the transformer (38) and the input of the output current limiter (44). The output of the output current limiter (44) is approximately 18 VDC at 2.5 A and the series connection of the shunt output voltage clamp (46) and the linear regulator (48) with the output of the output current limiter (44) provides a second DC output of approximately 15 volts to the high voltage generator (switcher) (14). A circuit schematic of the Line Power Supply (12) portion of the High Voltage Power Supply (10) is shown in FIG. 8.

The high voltage portion employs another switched mode power supply (SMPS) (14) using a push-pull converter topology with voltage feedback. The push-pull converter has advantages of compact design and lower output ripple. A voltage doubler is used to double the output voltage of the transformer during the rectification. An output filter is used to reduce the ripple to required levels. The feedback mechanism is used to provide a stable regulated output based on a precision reference.

Figure 3:
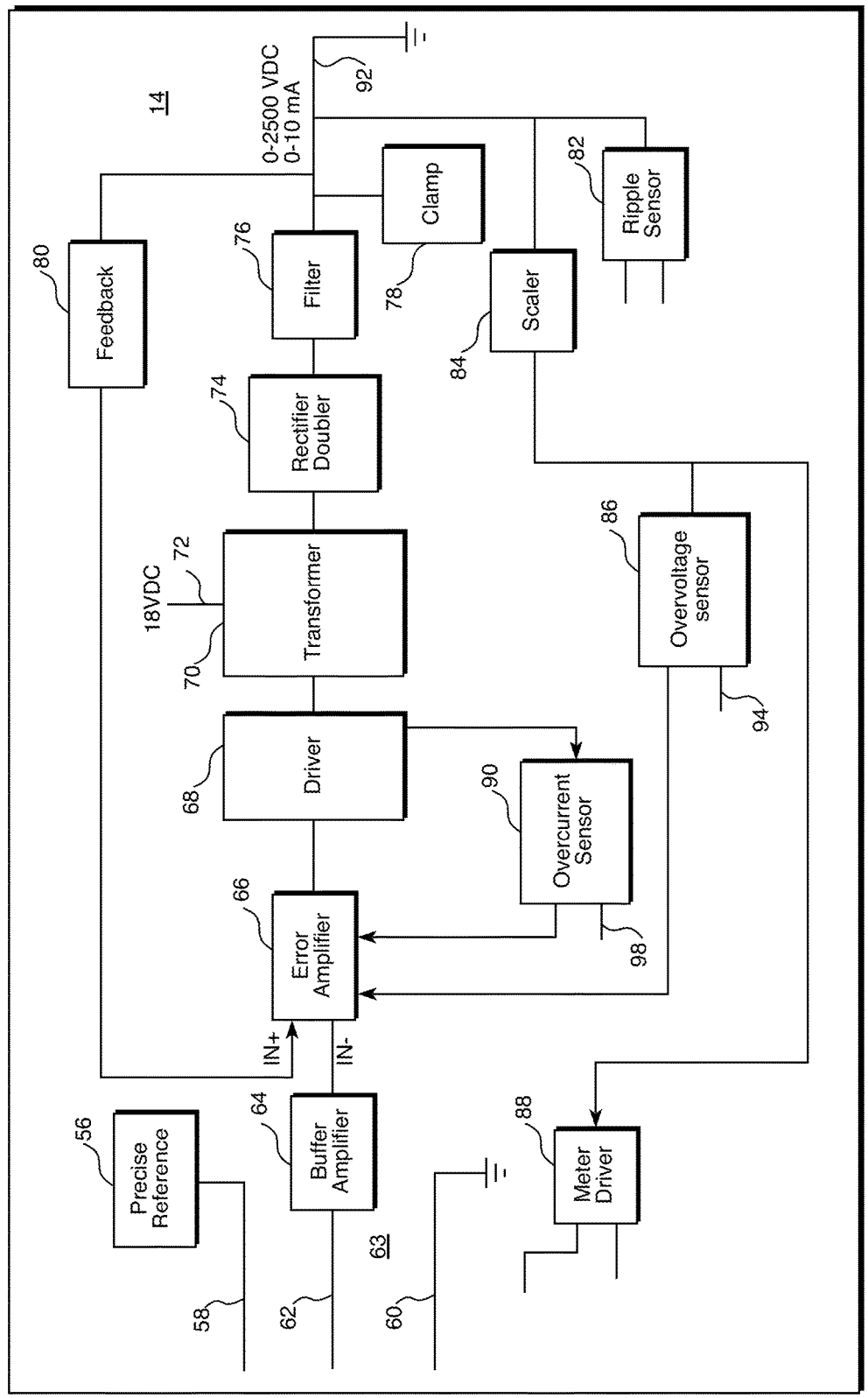
FIG. 3 is a component block diagram of the high voltage portion of the High Voltage Power Supply of FIG. 2.

FIG. 3 is a block diagram of the high voltage portion (14) of the High Voltage Power Supply (10) of this invention. The 15 VDC output from the Line Powered Switcher (12) provides the operating power for the controller integrated circuit as well as other active electronic components used in the High Voltage Switcher (14). The 18 VDC output from the Line Powered Switcher (12) is fed to an 18 VDC input (72) on the high voltage transformer (70) on the High Voltage Switcher (14). A precision reference input (56), of approximately 10 VDC in this exemplary embodiment, is provided at the high terminal (58) on the potentiometer (63) on the input side of the High Voltage Switcher (14). A variable output through the potentiometer wiper (62) controls the amount of the voltage that appears at the High Voltage Switcher output terminal (92). The low side (60) of the potentiometer (63) coil is grounded and the output of the potentiometer wiper (62) is fed through a buffer amplifier (64) to the negative side of controller error amplifier (66), which functions to serve as the target set-point voltage within the controller (66) whose output pulses are of a width based on the difference between the target voltage and the feedback voltage from the feedback circuit (80). The output of the controller (66) is fed through driver/switches (68) to an input on the high voltage transformer (70) whose alternating current output is further enhanced and converted to direct current by the output rectifier/doubler (74) and output filter (76). The output is then clamped by the output voltage clamp (78) and is available to be communicated to the ex-core radiation detectors at output terminal (92). A reduced magnitude sample of the output is also fed back by the feedback loop (80) to the positive input on the controller (66) to provide a stable output based on the precision reference supplied by the wiper (62). The output (92) is also fed back through an output scaler (84) to an overvoltage sensor (86) and a meter driver (88). The overvoltage sensor (86) identifies an abnormally high voltage condition and sends a shutdown signal to the controller (66) upon such an occurrence. The overvoltage sensor (86) also provides an indicator signal (94) that identifies an abnormally high voltage condition of the High Voltage Generator (10) on the casing of the High Voltage Generator. In the case of the Source Range drawer, the output of the meter drive (88) is available to drive a meter on the face of an instrumentation drawer in which the High Voltage Generator is maintained. For the Intermediate Range and Power Range drawers, the meter drive signal is used to drive a test point built into the drawers. This is configurable at the time of manufacture with a jumper setting within the meter drive circuitry (88) that corresponds to another jumper that sets the output voltage range. The output (92) is also conveyed to a ripple sensor (82) that conveys any ripple in the output signal and provides both an indicator signal in cases of excessive ripple voltage which is determined by comparison to a permanent set-point within the ripple sensor circuit (82). An overcurrent sensor (90) monitors the current from the driver/switches (68) and provides a shutdown signal to the controller (66) when an abnormal condition is monitored and provides an indicator signal which shows on the casing (96). Thus, the output voltage can be varied between 0 and 2500 VDC at 0 to 10 mA (depending on the load) by varying the position of the potentiometer wiper (62).

One of the important objectives of the high voltage output of this invention is to maintain low output ripple (15 mV pk-pk) at all voltages and loads. Output ripple can be more precisely defined as Periodic and Random Deviations (PARD) which encompasses periodic ripple as well as periodic impulsive type noise caused by internal supply switching and non-periodic changes in the output due to various other circuit interactions. Specific printed circuit board layout and grounding techniques will help reduce PARD to the required level.

The high voltage portion of the supply (14) will also source up to 10 mA of load current at all output voltages, provide adjustment down to 0 VDC, and provide interfaces to the drawer potentiometer (63) and meter for proper control and monitoring.

Another important objective of the invention is to include various fault protection capabilities to limit the consequences of internal failures and external faults. For instance, through the current sensing circuit (90), the output will contain a current limit of approximately 13 mA regardless of output voltage. This prevents the supply from overload in an abnormally heavy load or a short circuit on the output. In the unlikely event of an internal fault in the high voltage feedback, a voltage sensing circuit (86) will shut down the high voltage if the output exceeds the programmed voltage by approximately 250 V. The Line Powered Switcher (12) contains an output voltage clamp (46) to prevent the output from exceeding 20 VDC. If the voltage exceeds 20 VDC excessive current through the clamp will cause a fuse to open to reduce the risk of unpredictable high voltage circuit behavior. This prevents overload in the Line Powered Switcher (12) and reduces risk of fire. The over-voltage and over-current conditions both contain LEDs (94), (98) on the top panel of the High Voltage Generator casing (96) to indicate entry into those modes of operation, as can be appreciated from FIGS. 4 and 5.

Figure 4:
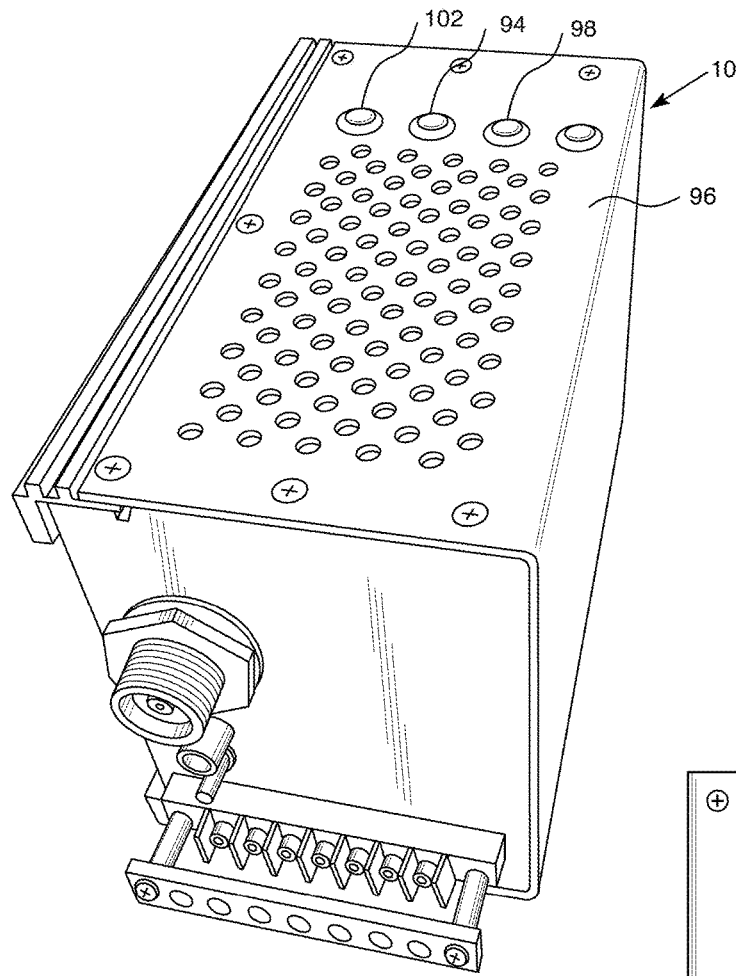
FIG. 4 is a rear/top perspective view of the outside of the casing housing the High Voltage Power Supply of FIGS. 2 and 3.
Figure 5:
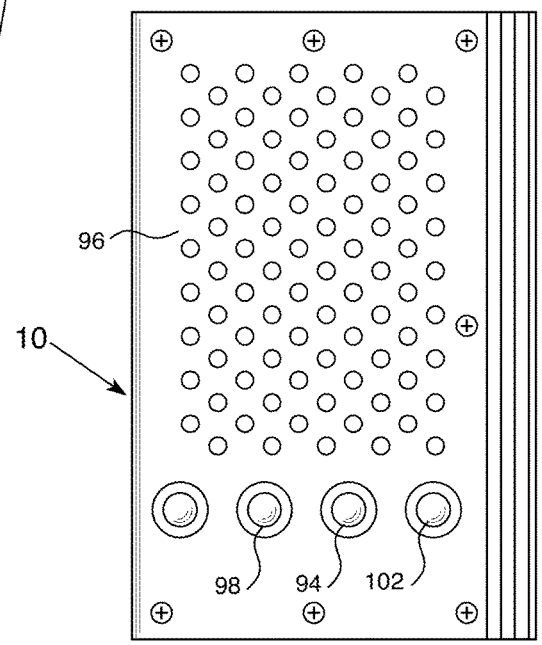
FIG. 5 is a top view of the High Voltage Power Supply shown in FIG. 4.
Figure 6:
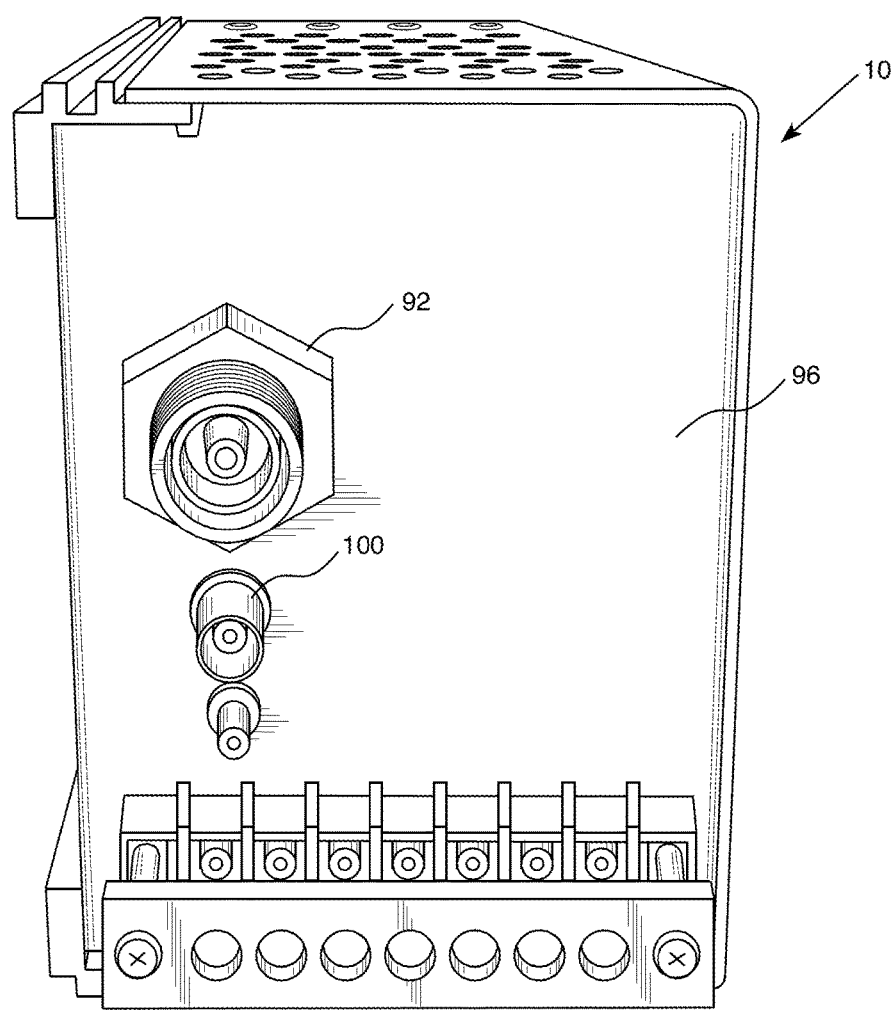
FIG. 6 is a rear view of the High Voltage Power Supply shown in FIG. 4.
Figure 7:
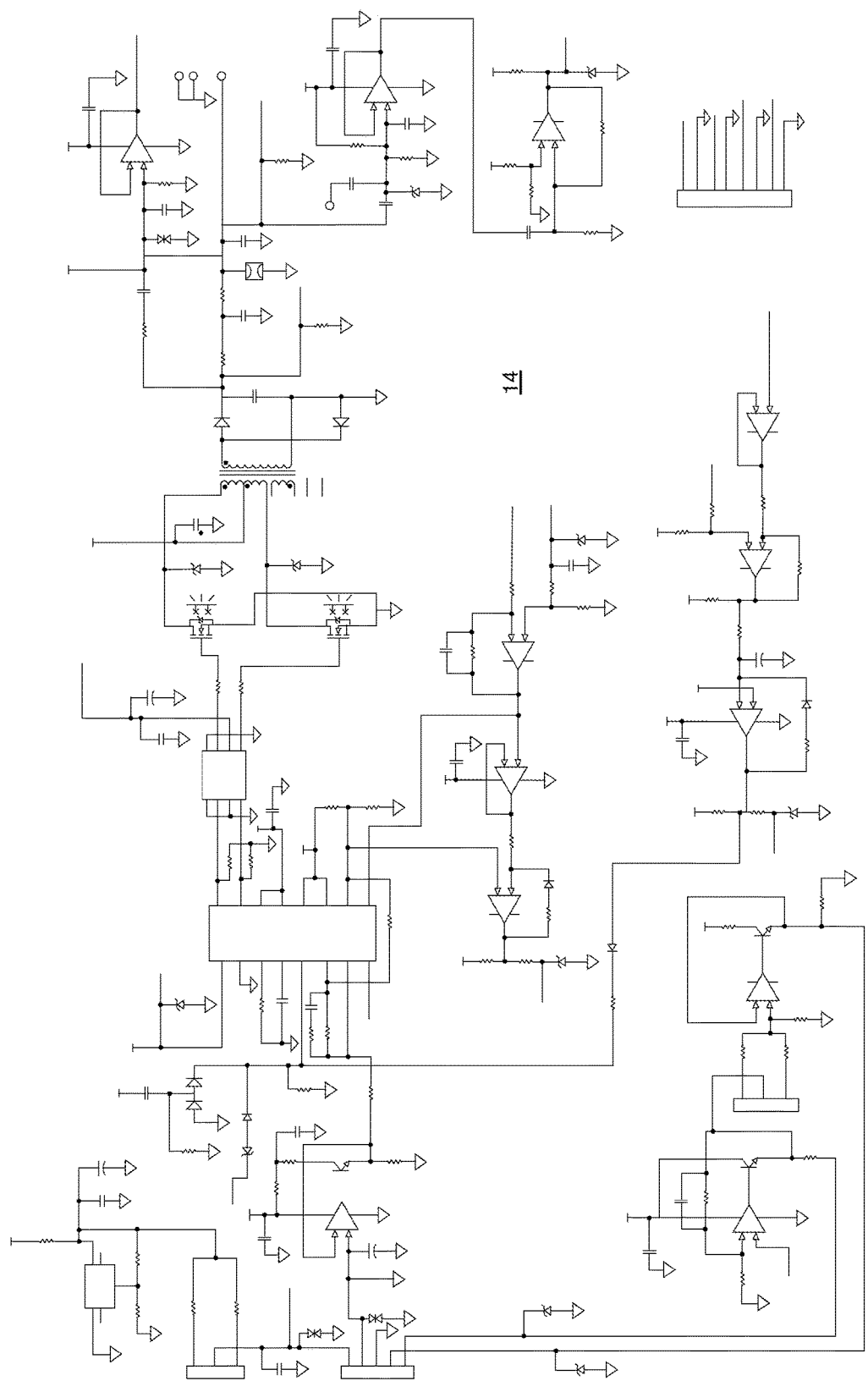
FIG. 7 is a schematic circuitry diagram of the high voltage portion of the High Voltage Power Supply shown in block form in FIG. 3.

An additional protection circuit also ensures the high voltage output is disengaged if the external programming potentiometer is faulty or is not connected properly. Redundant fault detection circuitry in the form of a clamp prevents the unit from significantly exceeding the output voltage range in the case of multiple point failures. AC ripple diagnostics can be performed on the replacement power supply with a Bayonet Neill-Concelman (BNC) Connector ripple test point (100) shown in FIG. 6. The test point will allow direct ripple measurement while in operation without affecting the output during normal operation. In situations where the ripple is extreme and may effect detector operation, an LED (102) on the top panel, as shown in FIGS. 4 and 5, will indicate excessive ripple beyond approximately 50 mV peak.

The High Voltage Power Supply of this invention will offer more flexibility in adjustment than the current supplies which have a lower limit of approximately 300 VDC. The supply of this invention will be able to adjust to 0 VDC which will eliminate the need to switch in separate supplies during customer bias curve generation and other related service activities.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:
1. A power supply including;
an alternating current input;
a direct current output that is configured to be adjustable between substantially 0 and 2,500 VDC;
a test point configured to provide an operator with information about any alternating current component of the direct current output, superimposed on the direct current output; and
wherein the power supply comprises two separate circuit modules, a first module of the two separate circuit modules comprises a line powered switcher for converting the alternating current input into a steady state direct current at the direct current output and a second module of the two separate circuit modules comprises a high voltage switcher constructed to raise the voltage level inputted from the first module to a desired output voltage and the first module and the second module are respectively independent switched mode power supplies;
wherein the first module includes a series arrangement of an input current limiter, a first surge protector, an inrush limiter, a line filter, an EMI filter, a second surge protector, an input rectifier/filter, a transformer, an output rectifier and an output filter; and further including a controller/switch optically coupled in series with a reference generator in parallel with series arrangement of the transformer, output rectifier and output filter.

2. The power supply of claim 1 wherein one of the first surge protector and the second surge protector is a Metal Oxide Varistor.

3. The power supply of claim 2 wherein another of the first surge protector and the second surge protector is a transient voltage suppressor.

4. The power supply of claim 1 wherein the second module comprises:
- a potentiometer including a resistive wire connected between a reference voltage and ground and a wiper configured to move along and in electrical contact with the resistive wire, the wiper being connected in a series arrangement including:
- a buffer amplifier;
- a controller;
- a driver/switches;
- a high voltage transformer;
- an output rectifier doubler; and
- an output filter.

5. The power supply of claim 4 including a feedback loop between an output of the output filter and an input to the controller.

6. The power supply of claim 4 including an overvoltage sensing circuit connected between an output of the output filter and the controller in parallel with the series arrangement, the overvoltage sensing circuit being configured to identify an overvoltage condition and signal the controller when an overvoltage condition is detected to shut down the power supply.

7. The power supply of claim 4 including an overcurrent sensing circuit connected between the controller and the driver/switches, in parallel with the series arrangement, the overcurrent sensing circuit being configured to identify an overcurrent condition and signal the controller when an overcurrent condition is detected to shut down the power supply.

8. The power supply of claim 1 wherein the power supply is at least partially enclosed within a housing including a plurality of lights visible from the housing which, when lit, respectively identify a potential overcurrent, overvoltage and ripple condition in the direct current output.

* * * * *